United States Patent [19]

Bergmans et al.

[11] Patent Number: 4,835,765
[45] Date of Patent: May 30, 1989

[54] ARRANGEMENT FOR FULL-DUPLEX DATA TRANSMISSION OVER TWO-WIRE CIRCUITS

[75] Inventors: Johannes W. M. Bergmans; Theodoor A. C. M. Claasen; Petrus J. Van Gerwen, all of Eindhoven, Netherlands

[73] Assignee: U.S. Philips Corporation, New York, N.Y.

[21] Appl. No.: 2,080

[22] Filed: Jan. 12, 1987

[30] Foreign Application Priority Data

Jan. 17, 1986 [NL] Netherlands .................. 8600087

[51] Int. Cl.⁴ .............................................. H04B 3/23
[52] U.S. Cl. .................................... 370/32.1; 379/410
[58] Field of Search .................. 379/406, 410, 411; 375/18, 58; 370/32, 32.1

[56] References Cited

U.S. PATENT DOCUMENTS

| 4,117,277 | 9/1978 | Van den Elzen et al. | 375/18 X |
| 4,587,382 | 5/1986 | Yang | 379/410 X |
| 4,672,633 | 6/1987 | Claasen et al. | 375/58 |

FOREIGN PATENT DOCUMENTS

| 0137508 | 4/1985 | European Pat. Off. | 379/410 |
| 0030134 | 2/1986 | Japan | 379/406 |

OTHER PUBLICATIONS

"Results of Experiments with a Digital Hybrid in Two-Wire Digital Subscriber Loops", B. Aschrafi et al., NTG-Fachber (Germany), vol. 73, 1980, pp. 21-5.
G. F. M. Beenker et al., "Design of Smearing Filters for Data Transmission Systems", IEEE Transactions on Communications, vol. Com-33, No. 9, Sep. 1985, pp. 955-963.
P. J. Van Gerwen et al., "Design Consideration for a 144 Kbit/s Digital Transmission Unit for the Local Telephone Network", IEEE Journal on Selected Areas in Communications, vol. Sac-2, No. 2, Mar., 1984, pp. 314-323.

Primary Examiner—Jin F. Ng
Assistant Examiner—Randall S. Vaus
Attorney, Agent, or Firm—Thomas A. Briody; Jack E. Haken; Anne E. Barschall

[57] ABSTRACT

An arrangement for full-duplex data transmission over a two-wire circuit (1) comprises a transmit channel (2) connected to a baseband data transmitter (6) and including a smearing filter (18), a receive channel (3) connected to a baseband data receiver (9) and including a complementary smearing filter (19), a hybrid junction (4), an echo canceller (14) with an adaptive filter (15) and an adjusting circuit (16), and a combining circuit (17) inserted in the receive channel (3). Despite the application of the smearing filters (18, 19) the complexity of the echo canceller (14) is not increased as the arrangement comprises first and second delay means (20, 21) with a delay (D) corresponding to the signal delay of the cascade connection of the smearing filters (18, 19), the first delay means (20) having been inserted in a first signal path from the output of data transmitter (6) to the adjusting circuit (16) and the second delay means (21) having been inserted in a second signal path from the output of data transmitter (6) via the adaptive filter (15) and the combining circuit (17) to a point (P) in the receive channel (3) where the residual signal to be applied to the adjusting circuit (16) is tapped, and the complementary smearing filter (19) in the receive channel (3) has been inserted between the hybrid junction (4) and the tapping point (P) for the residual signal.

8 Claims, 5 Drawing Sheets

ARRANGEMENT FOR FULL-DUPLEX DATA TRANSMISSION OVER TWO-WIRE CIRCUITS

(A) BACKGROUND OF THE INVENTION

1. Field of the Invention

The invention relates to a circuit for full-duplex data transmission over a two-wire circuit. The arrangement comprises a one-way transmit channel connected to a baseband data transmitter, a one-way receive channel connected to a baseband data receiver, a hybrid junction for interconnecting the transmit and receive channels and the two-wire circuit, an echo canceller comprising an adaptive filter with adjustable filter coefficients and an adjusting circuit for the filter coefficients, and a combining circuit inserted in the receive channel, the adaptive filter generating an approximated echo signal from signals in the transmit channel, the combining circuit differentially combining the approximated echo signal with incoming signals of the receive channel to generate a residual signal and the adjusting circuit, in response to signals in the transmit channel and the residual signal in the receive channel, adjusting the adaptive filter coefficients to minimize a predetermined function of the residual signal.

2. Prior Art

A similar arrangement is known from the article by P. J. van Gerwen et al. in IEEE J. Select, Areas Commun., Vol. SAC-2, No. 2, March 1984, pp. 314–323.

For the full-duplex data transmission use is often made of the circuits of the public telephone network. In the local network the circuits are usually of the two-wire type. Data transmission is then subject to four main types of impairments: echo signals, intersymbol interference, cross-talk from ever present signals in adjacent wire-circuits and noise (background noise and impulse noise). Many of the arrangements available now for full-duplex data transmission over two-wire circuits comprise an echo canceller with an adaptive filter to considerably reduce the disturbing effect of echo signals, the adaptive filter coefficients being usually adjusted iteratively according to a criterion for minimizing the mean square value of the remaining echo in the residual signal. The data receivers utilized in these arrangements further comprise the current arrangements for strongly reducing the disturbing effect of intersymbol interference, ever present crosstalk and background noise. However, in the arrangements known thus far no specific precautions have been taken to reduce the influence of impulse noise consisting of concentrated pulse-like disturbances occurring at irregular intervals and usually far apart. The influence of this impulse noise is particularly felt in longer circuits operating at higher data rates.

A possibility to combat the effect of impulse noise known per se is the insertion of a smearing filter at the transmit end and a complementary smearing filter (also referred to as desmearing filter) at the receive end of the circuit. The two filters generally have a flat amplitude characteristic, but their group delays vary in the prescribed frequency band in a contrary fasion, the sum of the group delays being made as flat as possible. In the ideal case, a data signal passing through the two filters merely experiences a delay. A noise impulse injected into the channel, however, passes only the complementary smearing filter at the receive end so that the energy of such a noise impulse is smeared in time and, consequently, its effect on the received data signal may be decreased at any moment. Further details about the design and implementation of efficient and yet simple smearing filters for data transmission can be found in the article by G. F. M. Beenker et al. in IEEE Trans. Comm., Vol. COM-33, No.9, September 1985, pp. 955-963.

In the arrangement for full-duplex data transmission over two-wire circuits, the effect of impulse noise can be combatted in the same manner by connecting the data transmitter via a smearing filter to the input of the one-way transmit channel and by connecting the data receiver via a complementary smearing filter to the output of the one-way receive channel. This way of connecting the smearing filters implies that the signals in the transmit channel applied to the echo canceller are now formed by smeared data signals having a considerably greater number of significant signal values than would be the case without smearing filters. This also results in a considerably more complicated implementation of the echo canceller as the signal samples to be applied to the digital echo canceller have to be represented with a far greater number of bits. This is an undesired effect, more specifically in view of the expectation that smearing filters need only be used for a limited number of circuits in the local telephone network, so that the complexity of the echo canceller present in each two-wire circuit is of far greater importance than that of the smearing filters, which should be considered an option not applied relatively frequently.

(B) SUMMARY OF THE INVENTION

The invention has for its object to provide an arrangement for full-duplex data transmission of the type set forth in the preamble of paragraph (A), in which smearing filters are applied without increasing thereby the complexity of the echo canceller.

The arrangement according to the invention is characterized in that the arrangement comprises first delay means inserted in a first signal path from the data transmitter output to the adjusting circuit, and second delay means inserted in a second signal path from the data transmitter output via the adaptive filter and the combining circuit to a point in the receive channel where the residual signal to be applied to the adjusting circuit is tapped from the receive channel, the first and second delay means having a same delay substantially corresponding to the signal delay of the cascade connection of the smearing and complementary smearing filter, and the complementary smearing filter having been inserted in the receive channel between the hybrid junction and said tapping point for the residual signal.

(C) SHORT DESCRIPTION OF THE DRAWINGS

Embodiments of the invention and their advantages will now further be explained with reference to the drawings in which.

(D) DESCRIPTION OF THE EMBODIMENTS

D(1). General Description

Figure 1:
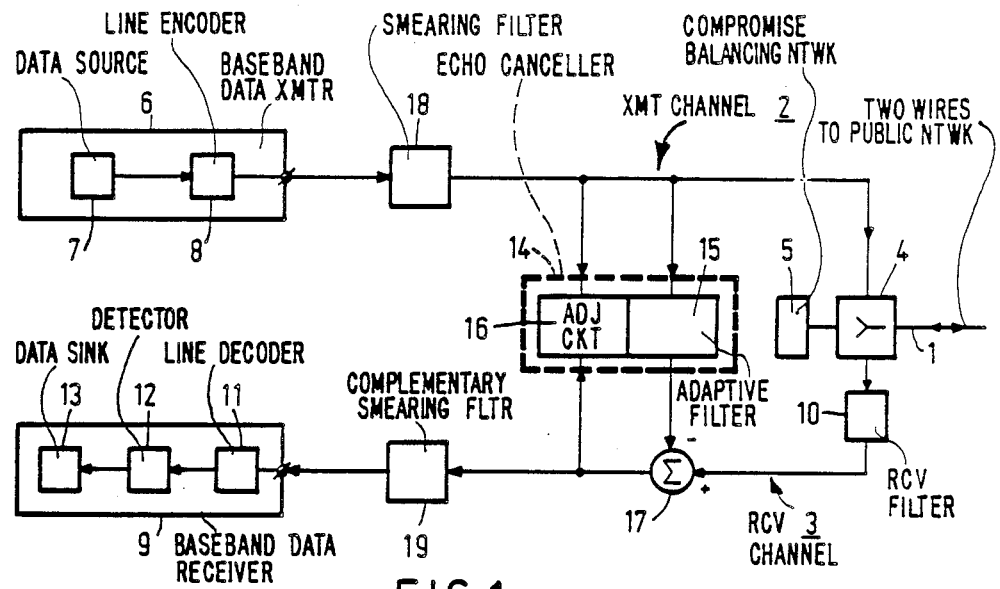
FIG. 1 shows a block diagram of a prior art arrangement for full-duplex baseband data transmission over two-wire circuits, the arrangement being provided in a known manner with smearing, filters to combat the effect of impulse noise.

In FIG. 1 the block diagram is represented of a known arrangement for full-duplex baseband transmission of binary data signals over a two-wire circuit 1 in the public local telephone network.

This arrangement comprises a one-way transmit channel 2, a one-way receive channel 3 and a hybrid junction 4 with a compromise balancing network 5 to interconnect these channels 2, 3 and two-wire circuit 1. A baseband data transmitter 6 is connected to transmit channel 2 and comprises a data source 7 and a line encoder 8 converting a binary data signal from data source 7 into a ternary data signal in accordance with the AMI code (Alternate Mark Inversion) for obtaining a line signal suitable for transmission over two-wire circuit 1. Via hybrid junction 4 and two-wire circuit 1 this line signal is transmitted to a remote arrangement not shown in FIG. 1, but implemented in the same manner. A line signal derived from this remote arrangement is transmitted over two-wire circuit 1 and applied via hybrid junction 4 to receive channel 3 and passed on therein to a baseband data receiver 9 via a receive filter 10. Data receiver 9 comprises a line decoder 11, a detector 12 for the data signal thus obtained and a data sink 13 to which the detected binary data signal is applied. Data receiver 9 may also contain an equalizer (not shown in FIG. 1) at the input of line decoder 11.

As the impedance of two-wire circuit 1 is not exactly known in practice, hybrid junction 4 is not perfectly terminated by compromise balancing network 5. This leads to a direct leak from transmit channel 2 to receive channel 3 via hybrid junction 4. In addition, impedance discontinuities in two-wire circuit 1 lead to signal reflections. Both effects lead to echoes of the data transmitter 6 output signal appearing in receive channel 3.

To reduce the disturbing effect of these echo signals as much as possible, the arrangement of FIG. 1 is provided with an echo canceller 14 which comprises an adaptive filter 15 with adjustable filter coefficients and an adjusting circuit 16 for these filter coefficients. In response to the line signal in transmit channel 2 this adaptive filter 15 generates an approximated echo signal which is subtracted, in a combining circuit 17, from the incoming signals of receive channel 3 (the received line signal from the remote arrangement, disturbances and the echoes of the line signal in transmit channel 2). At the output of combining circuit 17 a residual signal will then appear which is substantially echo-free and which is applied to data receiver 9.

In response to the line signal in transmit channel 2 and the residual signal in receive channel 3 the adjusting circuit 16 adjusts the filter coefficients of adaptive filter 15 so as to minimize a predetermined function of this residual signal. Usually this predetermined function is the mean square value of either the residual signal itself or an odd, non-decreasing function of the residual signal. The optimal adjustment of the filter coefficients is iteratively obtained with the aid of a gradient-type algorithm. Further details about the design and possible implementation of digital versions of echo canceller 14 and also of data receiver 9 are discussed in the aforesaid article by P. J. van Gerwen et al and the references mentioned therein.

However, especially in longer wire-circuits and at higher data rates, data transmission is also disturbed by a type of impairment known as impulse noise. This impulse noise consists of concentrated pulse-like disturbances occurring at irregular intervals and usually far apart. It is a known fact that the effect of the impulse noise can be combatted by inserting a smearing filter at the transmit end of the circuit and a complementary smearing filter at the receive end. In the arrangement represented in FIG. 1 use is made of this known measure by connecting data transmitter 6 via a smearing filter 18 to the input of transmit channel 2 and data receiver 9 via a complementary smearing filter 19 to the output of receive channel 3.

The use of the smearing filters 18, 19 in the arrangement of FIG. 1, however, results in the line signal in transmit channel 2 applied to the echo canceller 14 being now formed by a smeared data signal with a considerably greater number of amplitude levels than the three levels of the ternary data signal at the output of line encoder 8. Consequently, the implementation of echo canceller 14 becomes considerably more complex, as in that case much higher demands are to be made on the accuracy with which the signal to be applied to the echo canceller 14 is represented internally in echo canceller 14. Thus in a digital embodiment of echo canceller 14 this means a representation with a far greater number of bits than the two bits required for the representation of the ternary data signal at the output of line encoder 8. The strongly increased complexity of echo canceller 14 has a particularly undesired effect as it is expected that the smearing filters 18, 19 need only be introduced in a relatively small number of two-wire circuits of the local telephone network, making the complexity of the echo canceller 14 at each two-wire circuit of far greater importance than the complexity of the smearing filters 18, 19, which can be considered an option applied rather infrequently.

D(2) First Embodiment of the Invention

Figure 2:
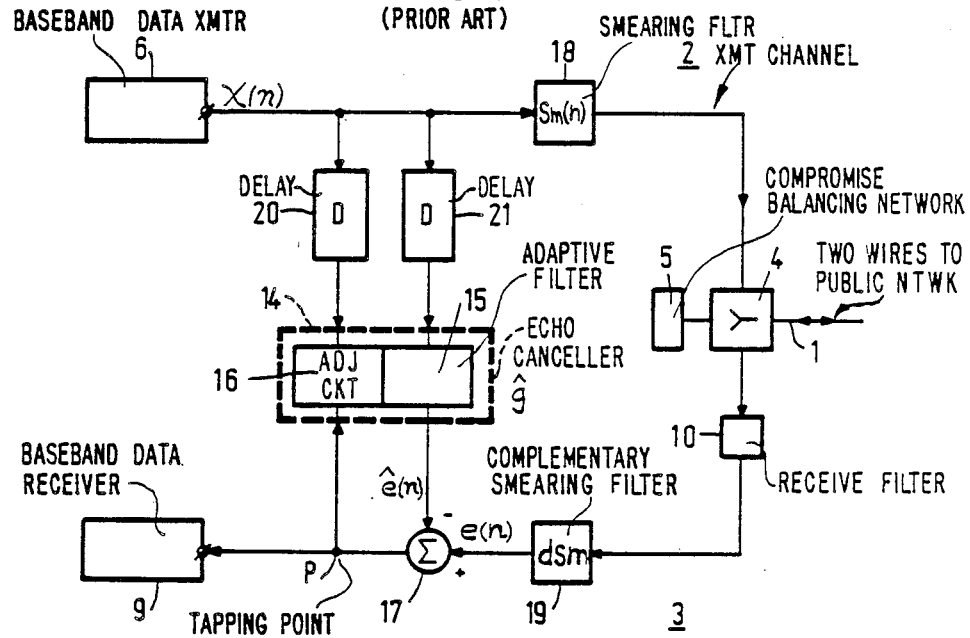
FIG. 2 shows a block diagram of a first embodiment of an arrangement according to the invention for full-duplex base-band data transmission over two-wire circuits.

FIG. 2 shows the block diagram of a first embodiment of an arrangement in accordance with the invention, wherein elements corresponding with elements in FIG. 1 are represented by the same reference numerals as in FIG. 1.

This arrangement comprises first delay means 20 inserted in a first signal path from the output of data transmitter 6 to the input of adjusting circuit 16 of echo canceller 14 and further comprises second delay means 21 inserted in a second signal path from the output of data transmitter 6 via adaptive filter 15 of echo canceller 14 and combining circuit 17 to a point P in receive channel 3 where the residual signal to be applied to adjusting circuit 16 is tapped from receive channel 3. These first and second delay means 20, 21 have the same delay D substantially corresponding to the signal delay S of the cascade connection of smearing filter 18 and complementary smearing filter 19. Complementary smearing filter 19 has further been inserted in receive channel 3 between hybrid junction 4 and the tapping point P for the residual signal. In the embodiment shown in FIG. 2, the second delay means 21 have been inserted in that part of the second signal path which is situated between the output of data transmitter 6 and the input of adaptive filter 15 and the complementary smearing filter has been inserted between hybrid junction 4 and combining circuit 17.

The effect of the application of these measures is that adaptive filter 15 and adjusting circuit 16 of echo canceller 14 receive signals from transmit channel 2 which are formed by delayed versions of the ternary data signal at the output of data transmitter 6 and, consequently, not by the smeared data signal at the output of smearing filter 18 as in the arrangement of FIG. 1. Thus the signals to be processed in the echo canceller 14 can be represented with the same degree of accuracy as when the smearing filters 18, 19 are not utilized, that is to say with a digital implementation of echo canceller 14 again with the two bits required for the representation of the ternary data signal at the output of data transmitter 6. In addition, it turns out that it will suffice that the impulse response of adaptive filter 15 in echo canceller 14 has the same length as in the case without the application of smearing filters 18, 19, despite the fact that the echo signal path now also includes the smearing filters 18, 19. This will be further explained for the case that adaptive filter 15 and smearing filters 18, 19 are transversal filters of the time-discrete type and thus equipped for processing signals whose samples occur at instants $t=nT$, where n is an integer with $-\infty < n < \infty$ and T is the sampling period. For convenience it is assumed that the sampling period T equalizes the symbol period of the data signals. It is further assumed that only data transmitter 6 is in operation and, consequently, that there is no line signal from the remote transmission arrangement and no impulse noise.

When the samples of the ternary data signal occurring at instant $t=nT$ at the output of data transmitter 6 are indicated by x(n) and the samples of the echo signal and the approximated echo signal occurring at instant $t=nT$ at the inputs of combining circuit 17 by e(n) and ê(n), respectively, and when in a similar manner for smearing filter 18, complementary smearing filter 19, echo path between the output of transmit channel 2 and the input of receive channel 3, and adaptive filter 15 the values of their impulse response at instant $t=nT$ are indicated by sm(n), dsm(n), g(n) and ĝ(n), respectively, then it holds that:

$$e(n)=(dsm \times g \times sm \times x)(n) \quad (1)$$

where the symbol "x" indicates the linear convolution operator and thus (dsm x g x sm x x) the linear convolution of the impulse responses dsm(n), g(n), sm(n) and x(n). Formula (1) can be rewritten as:

$$e(n)=((sm \times dsm) \times (g \times x))(n) \quad (2)$$

In the ideal case, the cascade connection of the smearing filters 18, 19 should only introduce a mere signal delay S over a number of $N_o$ sampling periods, so that:

$$S=N_0T \quad (3)$$

and this cascade connection should then have an impulse response h(n) with:

$$h(n)=(sm \times dsm)(n) \quad (4)$$

for which it holds that:

$$h(n)=\delta(n-N_o) \quad (5)$$

where $\delta(.)$ is the Kronecker delta function. However, in practice the smearing filters 18, 19 are not exactly complementary so that:

$$h(n)=\delta(n-N_0)+b(n) \quad (6)$$

where b(n) is the deviation from the ideal situation and represents the intersymbol interference introduced by the cascade connection of smearing filters 18, 19. With the aid of formulae (4) and (6), formula (2) can be written as:

$$e(n)=(g \times x)(n-N_0)+(b \times g \times x)(n) \quad (7)$$

It is now assumed that the cascade connection of smearing filters 18, 19 introduces such a small intersymbol interference b(n) that the second term in formula (7) may be disregarded. In that case it holds with a good approximation that:

$$e(n)=(g \times x)(n-N_0) \quad (8)$$

With a delay D of second delay means 21 equal to the cascade connection of smearing filters 18, 19 and thus with:

$$D=S=N_0T \quad (9)$$

adaptive filter 15 will receive input signal samples $x(n-N_o)$ and for the samples ê(n) of the approximated echo signal it holds:

$$ê(n)=(ĝ \times x)(n-N_0) \quad (10)$$

For the samples r(n) of the residual signal at the output of combining circuit 17 output, in the aforesaid assumptions exclusively formed by the samples of the residual echo signal the following holds:

$$r(n)=e(n)-ê(n)=(g \times x)(n-N_0)-(ĝ \times x)(n-N_0) \quad (11)$$

or:

$$r(n)=((g-ĝ) \times x)(n-N_0) \quad (12)$$

As the echo canceller 15 is designed for minimizing the mean square value of the residual signal, this minimizing will on account of formula (12) lead to the convergence of the impulse response ĝ(n) of adaptive filter 15 to the impulse response g(n) of the echo path between the output of transmit channel 2 and the input receive channel 3. However, this same convergence will also take place in case no smearing filters 18, 19 are applied.

Thus, the measures described enable smearing filters 18, 19 to be utilized without causing any changes in echo canceller 14 to be effected.

The diagrams of FIG. 3 show practical modifications of the arrangement of FIG. 2 as regards the connection of echo canceller 14 to transmit channel 2.

Figure 3A:
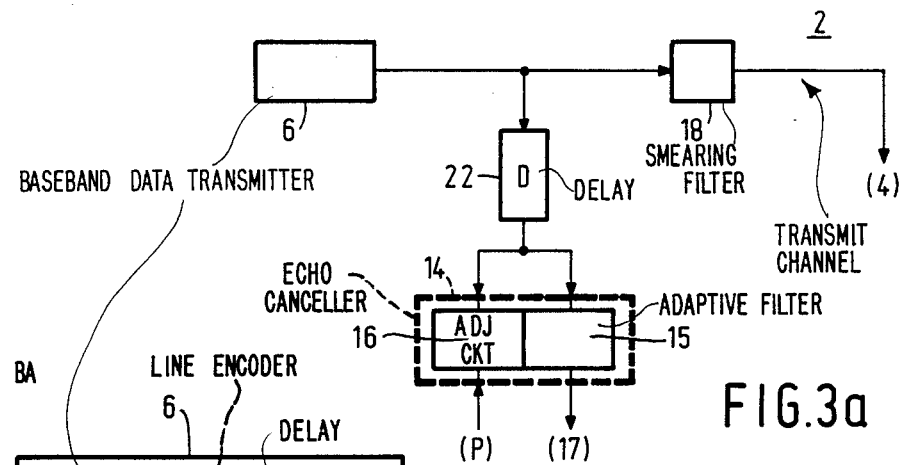
FIGS. 3a, 3b and 3c show three block diagrams of practical modifications of the arrangement of FIG. 2 as regards the connection of the echo canceller to the transmit channel.

In the diagram of FIG. 3a the functions of first and second delay means 20, 21 of FIG. 2 are jointly performed by delay means 22 common to the first and second signal paths, which delay means are inserted between the output of data transmitter 6 and the two interconnected inputs of echo canceller 14 for signals originating from transmit channel 2.

Figure 3B:
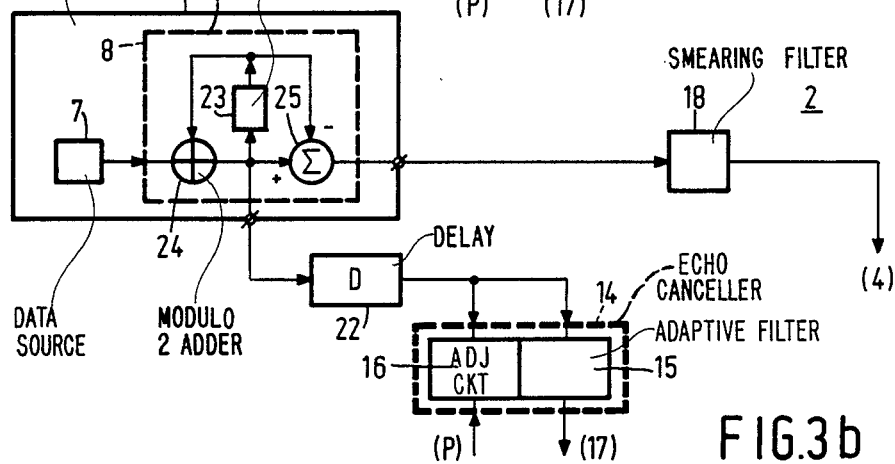

In the example under discussion line encoder 8 of data transmitter 6 is an AMI-coder. The diagram of FIG. 3b shows how in that event the measures described can be combined with measures disclosed in the U.S. Pat. No. 4,117,277 to simplify the implementation of the echo canceller 14. In the line encoder 8 of FIG. 3b, which is known per se, the binary data signal from data source 7 is converted into a modified binary data signal by adding modulo-2 with the aid of a modulo-2 adder 24 the binary data signal and the modified binary data signal which has been delayed over a time T by means of a delay circuit 23. The modified binary data signal is further converted into a ternary data signal by linearly subtracting the modified data binary data signal delayed over a time T from the modified binary data signal by means of combining circuit 25. This ternary data signal at the output of combining circuit 25 forms the normal output signal of data transmitter 6 which is applied to smearing filter 18. FIG. 3b differs from FIG. 3a in that the signal to be applied to echo canceller 14 via delay means 22 is not formed by this normal output signal of data transmitter 6, but in accordance with the aforementioned Patent is formed by the modified binary data signal at the output of modulo-2 adder 24 which is transferred to an a additional output of data transmitter 6. The simplification of the structure of the echo canceller 14(achieved by these measures the canceller input signal only needs to be represented with one bit instead of the two bits required in case of a ternary data signal) is thus retained when smearing filters 18, 19 are applied.

Figure 3C:
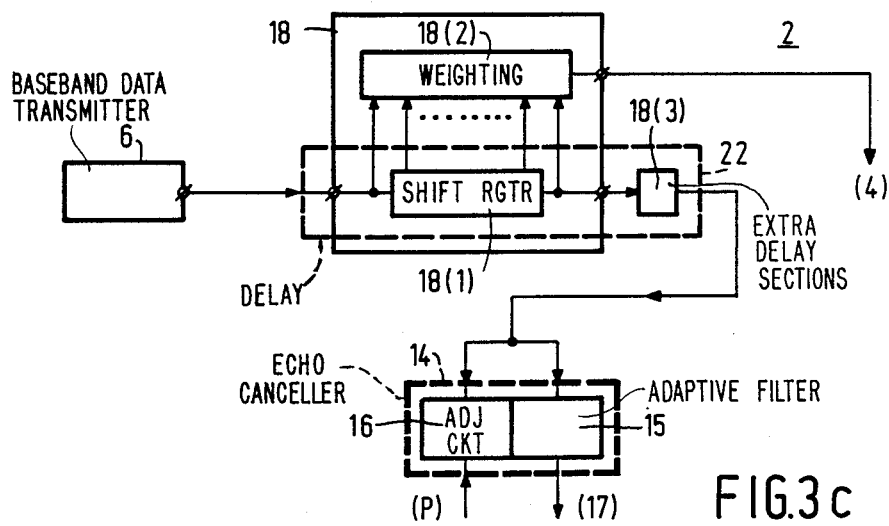

In the case of transversal smearing filters 18, 19 of the time-discrete type, the elements already available in smearing filter 18 can also be utilized for realizing the delay 22. As depicted in the diagram of FIG. 3c, such a smearing filter 18 comprises a shift register 18(1) connected to data transmitter 6 and formed by the series connection of a number of sections each having a delay T, and a weighting circuit 18(2) connected to taps of the sections of the shift register 18(1) for multiplying the tapped signals by filter coefficients and summing the resulting product signals, the sum signal forming the smeared data signal to be applied to hybrid junction 4. In FIG. 3c the sections of shift register 18(1) are likewise used to obtain the required delay $D=N_oT$ of delay means 22 by connecting the output of a certain section to the two inputs of echo canceller 14 for signals originating from transmit channel 2. In a design of the transversal (smearing filters 18, 19 as proposed in the aforesaid article by G. F. M. Beenker et al., the value $N_o$ can be equal to the number $(N-1)$ of the sections of the shift register 18(1) in smearing filter 18. The overall delay of the sections between the first and the last tap will then be $(N-1)T$, so that the required delay $N_oT=(N-1)T$ can be obtained by connecting the output of shift register 18(1) to echo canceller 14. In the event of $N_o$ exceeding $(N-1)$, the shift register 18(1) should be lengthened by one or more delay sections 18(3), as indicated in FIG. 3c, and the output of the thus lengthened shift register 18(1) should be connected to the echo canceller 14. If, in contrast thereto, $N_o$ were smaller than $(N-1)$, the output of a section preceding the last section of the shift register 18(1) should be connected to echo canceller 14.

So far the delay D of delay means 20, 21 and 22 has been chosen equal to the signal delay $S=N_oT$ of the cascade of smearing filters 18, 19. The intersymbol interference $(b \times g)(n)$ introduced by the cascade of these filters 18, 19 and the echo path falls partly within the interval of the impulse response of the actual echo path delayed over $N_o$ sample periods $g(n-N_o)$ and this part is likewise cancelled by echo canceller 14, as the interval of impulse response $\hat{g}(n-N_o)$ of adaptive filter 15 equals that of $g(n-N_o)$. In some instances, a sample of $(b \times g)(n)$ immediately preceding the interval of $g(n-N_o)$ can be considerably larger than a sample of $g(n-N_o)$ itself at the end of this interval. To reduce the combined influence of echo signals and intersymbol interference generated by the smearing filters 18, 19 themselves, it may be favourable to choose the delay D not being equal to the signal delay $S=N_oT$, but to use a slightly lower value $D=(N_o-1)T$ or $D=(N_o-2)T$.

In the first embodiment described, strict requirements are made on the smearing filters 18, 19 being complementary so as to keep the intersymbol interference b(n) in formula (6) for impulse response h(n) of their cascade of such a low value that in formula (7) for samples e(n) of the echo signal the second term $(b \times g \times n)(n)$ may be disregarded. As a criterion for the intersymbol interference the "second merit factor" $F_2$ has been introduced in the aforesaid article by G. F. M. Beenker et al, which in the case of formula (6) can be represented as:

$$F_2 = 1/[\Sigma_n b^2(n)]^{\frac{1}{2}} \tag{13}$$

disregarding the second term in formula (7) will then be justified if $F_2$ has a larger value than approximately 50 dB. However, a large value of $F_2$ is a disadvantage as, generally speaking, a large value of $F_2$ requires the coefficients of the smearing filters 18, 19 to be represented with great accuracy (in digital filters with a greater number of bits), making the implementation of smearing filters 18, 19 more intricate.

When using the smearing filters discussed in the aforesaid article, which have binary or ternary coefficients and consequently allow of a relatively simple implementation, only a value of $F_2$ of not more than approximately 20 dB can be realized, however. With the aid of a second embodiment of the arrangement according to the invention it will be explained how in that case the influence of the larger intersymbol interference b(n) generated by the smearing 18, 19 themselves can be counteracted in a simple manner.

D(3). Second Embodiment of the Invention

Figure 4:
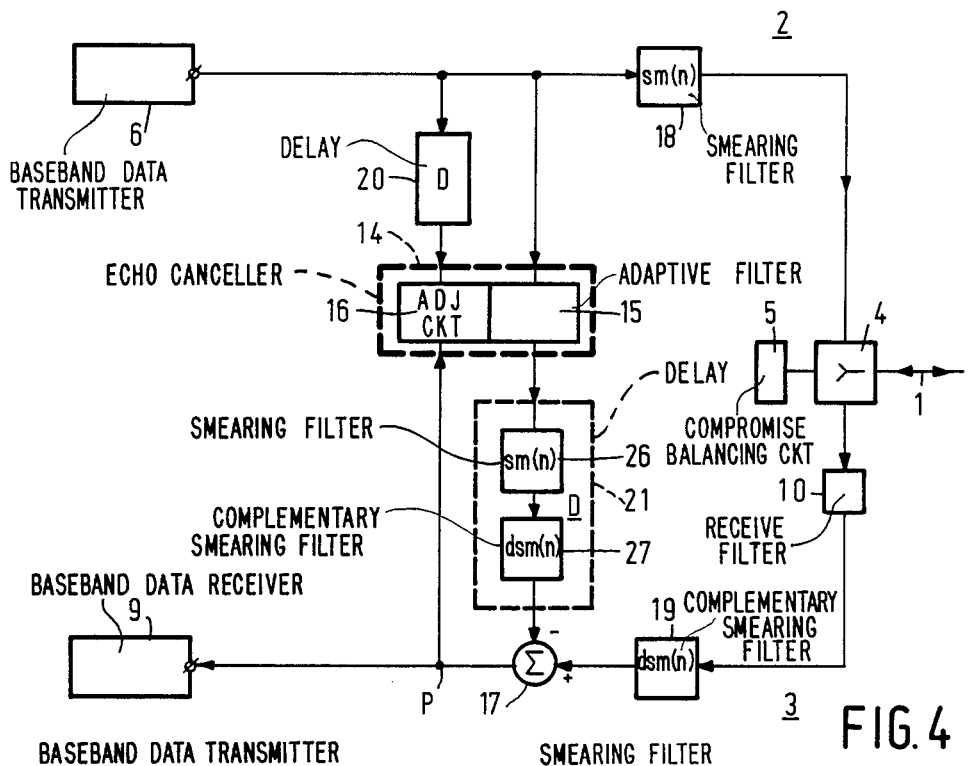
FIG. 4 shows a block diagram of a second embodiment of an arrangement according to the invention for full-duplex base-band data transmission over two-wire circuits.

FIG. 4 shows the block diagram of a second embodiment of an arrangement according to the invention, in which elements corresponding to elements in FIG. 2 are indicated by the same numerals as in FIG. 2.

The first difference between the arrangements of FIG. 2 and FIG. 4 is that in FIG. 4 the second delay means 21 have been inserted in the portion of the second signal path (from data transmitter 6 via adaptive filter 15 and combining circuit 17 to tapping point P for the residual signal in receive channel 3) situated between the output of adaptive filter 15 and the input of combining circuit 17 for the approximated echo signal.

When making the same assumptions with respect to the smearing filters 18, 19 of FIG. 4 as those in the explanation of the first embodiment, this explanation will also be applicable to the arrangement shown in FIG. 4. For the samples e(n) of the approximated echo signal at the input of combining circuit 17, it does not matter in this explanation whether second delay means 21 are placed before or after adaptive filter 15, so that in that case formula (10) for the samples e(n) also holds for the arrangement of FIG. 4.

However, when using in FIG. 4 smearing filters 18,19 described in the aforesaid article by G. F. M. Beenker et al. and having a second merit factor $F_2$ of approximately 20 dB, the intersymbol interference b(n) generated by these smearing filters 18, 19 themselves is so large in formula (6) that it is no longer justified to disregard the second term in the formula (7) for the samples e(n) of the echo signal.

The second difference between the arrangements of FIG. 2 and FIG. 4 is that in FIG. 4 the second delay means 21 are formed by the cascade of a smearing filter 26 and a complementary smearing filter 27, smearing filters 26 and 18 having the same impulse response sm(n) and complementary smearing filters 27 and 19 having the same impulse response dsm(n) too.

The cascade of smearing filters 26, 27 then has an impulse response h(n) in accordance with formulae (4) and (6) In FIG. 4 adaptive filter 15 of echo canceller 14 receives samples x(n) of the ternary data signal at the output of data transmitter 6 and produces samples $(\hat{g} \times x)(n)$ which, after having passed filters 26, 27, result in samples e(n) of the approximated echo signal at the input of combining circuit 17, for which it holds on account of formula (4):

$$\hat{e}(n) = (dsm \cdot sm \times \hat{g} \times x)(n) \quad (14)$$

or:

$$\hat{e}(n) = ((sm \quad dsm) \cdot \hat{g} \quad x))(n) \quad (15)$$

With the aid of formula (6) formula (15) can be written as:

$$\hat{e}(n) = (\hat{g} \times x)(n - N_0) + (b \times \hat{g} \times x)(n) \quad (16)$$

Based on formulae (7) and (16), the following holds for the samples $r(n) = \hat{e}(n) - e(n)$ of the residual signal at the output of combining circuit 17:

$$r(n) = ((g - \hat{g}) \times x)(n - N_0) + ((g - \hat{g}) \times b \times x)(n) \quad (17)$$

In this case, minimizing the mean square value of the residual signal by echo canceller 14 will also lead to the convergence of impulse response $\hat{g}(n)$ of adaptive filter 15 to impulse response g(n) of the echo path between the output of transmit channel 2 and the input of receive channel 3. A comparison of formulae (17) and (12) will then clearly show that not only the disturbing effect of the echo signal, but also the disturbing effect of the intersymbol interference caused by the smearing filters 18, 19 themselves is strongly reduced.

Thus, the measures taken in FIG. 4 not only allow smearing filters 18,19 to be applied without the necessity to modify echo canceller 14, but, in addition, they allow smearing filters 18, 19 to be applied that have lower values of the second merit factor $F_2$ than in the case of FIG. 2. As explained before, this offers the advantage of a simpler implementation.

Figure 5:
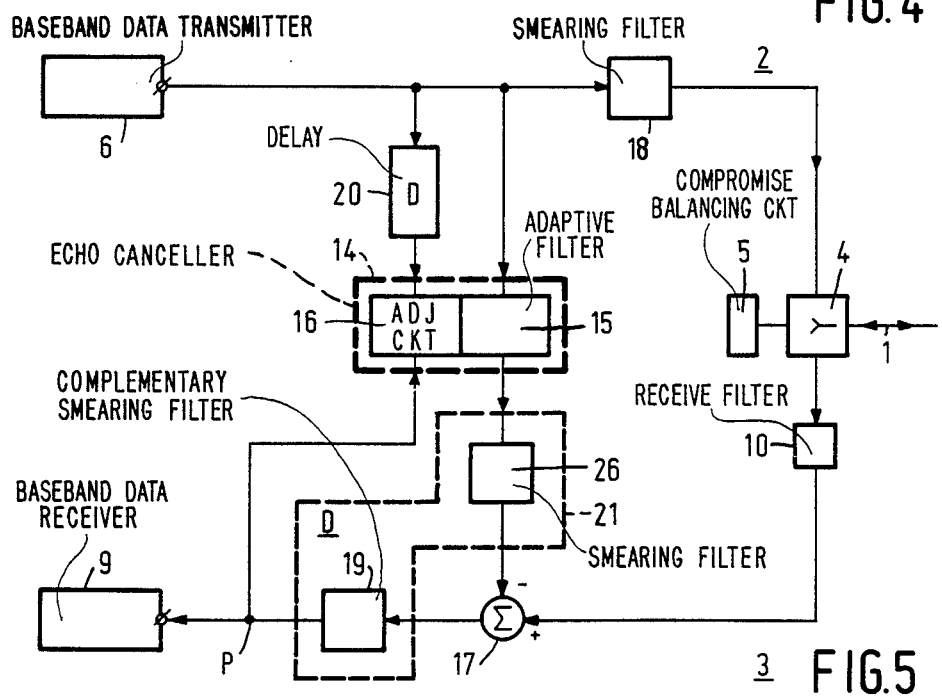
FIG. 5 shows a block diagram of a variant of the arrangement of FIG. 4 leading to a simpler implementation.

FIG. 5 shows the block diagram of a variant of the arrangement of FIG. 4 which can be derived in a simple manner by the fact that the functions of both complementary smearing filters 19, 27 at the inputs of combining circuit 17 can be carried out in combination by introducing a single complementary smearing filter 19 at the output of combining circuit 17. In that case, complementary smearing filter 27 is saved leading to a simpler implementation. However, when applying this variant it is no longer possible to add the output signal of an adaptive decision feedback equalizer in data receiver 9 to the approximated echo signal at the input of combining circuit 17 as complementary smearing filter 19 has then been included in the signal feedback loop of this adaptive equalizer and causes an inadmissible delay (it is a known fact that the maximum delay allowed in this loop is one symbol period T). In this case, the output signal of this adaptive equalizer should be subtracted from the residual signal in receive channel 3 by means of an additional combining circuit inserted between tapping point P and the data receiver 9 input.

As regards the practical implementation, all sorts of variants of the arrangements of FIG. 4 and FIG. 5 are still possible. Thus for the realization of first delay means 20 in FIGS. 4 and 5 a shift register already present in smearing filter 18 can be utilized in a manner similar to that shown in the diagram of FIG. 3c. In addition, smearing filters 26, 27 of second delay means 21 in FIG. 4 can be combined into one single filter.

D(4) Applications for Passband Data Transmission g paragraphs

The measures described in the preceding D(2) and D(3) for baseband data transmission can likewise be applied when the data signal is transmitted by means of passband transmission.

Figure 6:
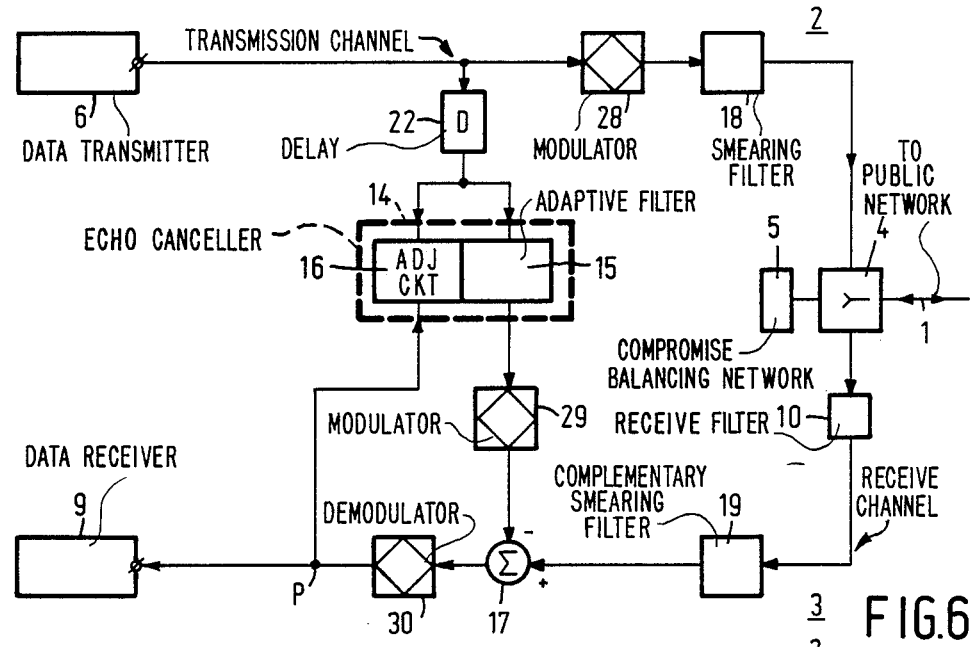
FIG. 6 shows a block diagram of a passband variant of the first embodiment of an arrangement according to the invention shown in FIG. 2, which variant is arranged for full-duplex passband data transmission over two-wire circuits.

FIG. 6 shows the block diagram of a variant of the first embodiment for passband transmission, a variant which is based on the modification of the arrangement of FIG. 2 in accordance with FIG. 3a. Elements in FIG. 6 corresponding to elements in FIGS. 2 and 3 have been indicated by the same reference numerals as in FIGS. 2 and 3.

The difference between the arrangement of FIG. 2 and FIG. 6 is that, with respect to the passband transmission, in FIG. 6 a modulator 28 has been placed at the input of smearing filter 18 in transmit channel 2, a modulator 29 corresponding to the modulator 28 has been placed at the output of adaptive filter 15 in the path of the approximated echo signal, and a demodulator 30 associated with modulators 28, 29 has been placed in the section of receive channel 3 situated between the combining circuit 17 output and tapping point P for the residual signal. As regards smearing filters 18 and 19, FIG. 6 differs from FIG. 2 in that the filters are of the passband type, but just like the filters in FIG. 2 strict requirements are made on the smearing filters 18, 19 being complementary in order to keep the intersymbol interference caused by the filters themselves sufficiently small.

Figure 7:
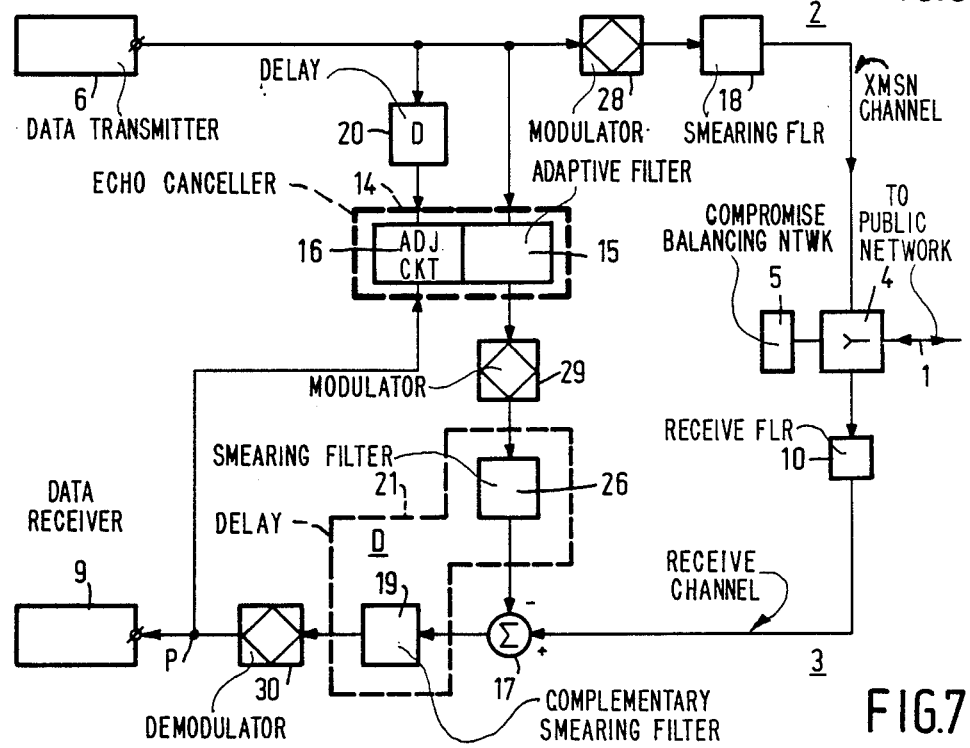
FIG. 7 shows a block diagram of a passband variant of the second embodiment of an arrangement according to the invention shown in FIG. 5, which variant is arranged for full-duplex passband data transmission over two-wire circuits.

Less strong demands on the smearing filters 18, 19 being complementary need to be made in a passband variant of the second embodiment, which variant is depicted in the block diagram of FIG. 7 and is based on the arrangement of FIG. 5. Elements in FIG. 7 corresponding to elements in FIG. 5 have been indicated by the same reference numerals as in FIG. 5.

In view of passband transmission, modulators 28, 29 and demodulator 30 have been inserted in the arrangement of FIG. 7 and that at the same locations as in the arrangement of FIG. 6. In the same manner as depicted in FIG. 5, smearing filter 26 has been placed in the path of the approximated echo signal at the input of combining circuit 17 in FIG. 7 and complementary smearing filter 19 in receive channel 3 at the output of combining circuit 17, whilst also in FIG. 7 smearing filters 26 and 18 have the same impulse response. Like in FIG. 6, in FIG. 7 the smearing filters 18, 19 and 26 are of the passband type too, but in FIG. 7 smearing filters 18, 19 that have lower values of the second merit factor $F_2$ can be applied, as owing to the presence of smearing filter 26 and the location of the complementary smearing filter 19 in FIG. 7 the disturbing effects of the intersymbol interference caused by the smearing filters 18 and 19 themselves are strongly reduced in a manner similar to that in FIG. 5 and with the same advantageous effect of a simpler implementation.

In FIG. 6 and FIG. 7 all smearing filters 18, 19 and 26 are of the passband type. However, also when passband transmission is applied there is a possibility to utilize smearing filters of the baseband type as will be illustrated with reference to FIG. 8.

Figure 8:
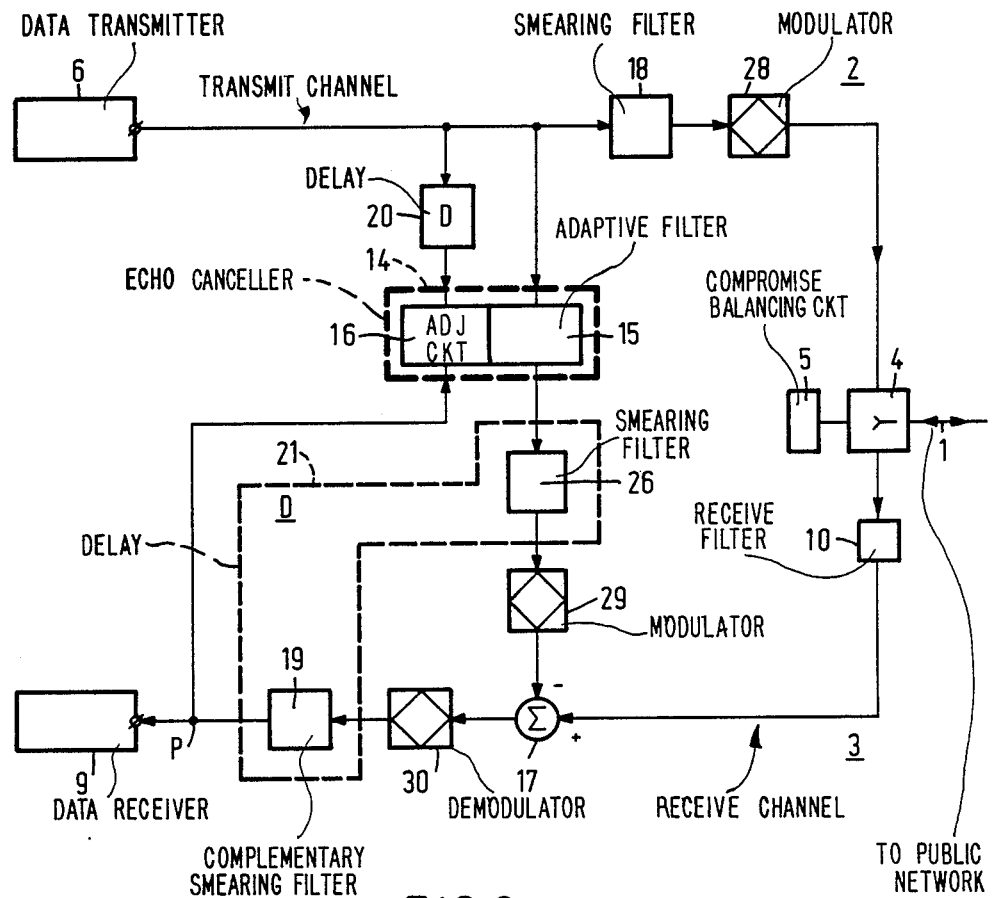
FIG. 8 shows a block diagram of a variant of the arrangement of FIG. 7, in which smearing filters of the base-band type have been applied.

FIG. 8 shows a different passband variant of the second embodiment that can be derived from the block diagram of FIG. 7 by interchanging the location of the elements in the following cascade connections: modulator 28 and smearing filter 18 in transmit channel 2, modulator 29 and smearing filter 26 in the path of the approximated echo signal, complementary smearing filter 19 and demodulator 30 in receive channel 3. As a result of this change of location, all smearing filters 18, 19 and 26 in FIG. 8 are filters of the baseband type. Just like in FIG. 7, the demands on the smearing filters 18, 19 being complementary need be less strong than they are in FIG. 6.

Apart from the configurations depicted in FIG. 6, FIG. 7 and FIG. 8, mixed configurations are also possible in which some of the smearing filters 18, 19 and 26 operate in the passband and others in the baseband. These mixed configurations do not offer essential advantages with respect to the configurations already shown, but do considerably add to the problem of designing smearing filters.

Among the possible configurations the arrangements of FIG. 6 and FIG. 7 are preferred with respect to the optional application of smearing filters, as the remaining elements of these arrangements do not require any substantial changes thereto. Thus, in FIG. 6 and FIG. 7 use can be made of the measures disclosed in the U.S. Pat. No. 4,162,378 to combine echo canceller 14 and modulator 29 into one assembly by means of a principle known as "echo modulation". However, the measures disclosed in this Patent cannot be utilized in FIG. 8 as smearing filter 26 has been inserted between modulator 29 and adaptive filter 15 of echo canceller 14. Insertion of smearing filter 18 before modulator 28 in transmit channel 2 of FIG. 8 further causes modulator 28 to be more intricate than in the event without the application of smearing filters, but modulator 28 in transmit channel 2 of FIG. 6 and FIG. 7 need not be modified when applying smearing filters. In view of the less strong demands on the smearing filters 18, 19 being complementary, the arrangement of FIG. 7 is to be preferred to the arrangement of FIG. 6.

For the arrangements of FIG. 6 and FIG. 7 it may be advantageous for the passband data signal transmission to utilize an adaptive passband equalizer (not shown) inserted at the input of demodulator 30 in receive channel 3 instead of an adaptive baseband equalizer (not shown either) in data receiver 9 (compare, for example, the article by S. B. Weinstein in IEEE Trans. Commun., Vol. COM-25, No. 7, July 1977, pages 654–666). To avoid undesired interaction between adjusting circuit 16 of echo canceller 14 and the adjusting circuit of this passband equalizer, the residual signal should then be tapped from receive channel 3 at a point at the input of this passband equalizer and be demodulated separately before being applied to adjusting circuit 16 of echo canceller 14.

What is claimed is:

1. An arrangement for full-duplex data transmission over a two-wire circuit, said arrangement comprising:
   a. a one-way transmit channel having an input for coupling with a baseband data transmitter and including a smearing filter;
   b. a one-way receive channel having an output for coupling with a baseband data receiver;
   c. a hybrid junction for interconnecting the transmit and receive channels and the two-wire circuit;
   d. an echo canceller comprising
      i. an adaptive filter with adjustable filter coefficients for generating an approximated echo signal from signals in the transmit channel; and
      ii. an adjusting circuit for adjusting the filter coefficients, in response to signals in the transmit channel and in response to a residual signal in the receive channel, so as to minimize a predetermined function of the residual signal, said adjusting circuit being coupled with a tapping point in said receive channel so as to receive the residual signal; and
   e. a combining circuit in the receive channel for differentially combining the approximated echo signal with incoming signals from the receive channel to generate the residual signal;
   f. first delay means in a first signal path which extends from an output of the data transmitter to the adjusting circuit;
   g. a complementary smearing filter disposed within the receive channel between the hybrid junction and said tapping point;
   h. second delay means in a second signal path which extends from the output of the data transmitter via the adaptive filter and the combining circuit to said tapping point, the first and second delay means creating a delay in the approximated echo signal so as to substantially compensate for a signal delay resulting from the cascade of the smearing filter and the complementary smearing filter; and
   whereby the complexity of the echo canceller is not affected by the presence of the smearing and complementary smearing filters.

2. An arrangement as claimed in claim 1 wherein the smearing filter in the transmit channel is a time-discrete transversal filter with a shift register connected to the data transmitter output which shaft register likewise forms part of the first delay means.

3. An arrangement as claimed in claim 1 wherein the second delay means is between the adaptive filter and the combining circuit, the second delay means comprising a cascade of a second smearing filter and a second complementary smearing filter, having respective impulse responses corresponding to the impulse responses of the smearing filter in the transmit channel and the complementary smearing filter in the receive channel.

4. An arrangement as claimed in claim 1 wherein the second delay means is between the adaptive filter and said tapping point for the residual signal, the second delay means including:
   (a) a second smearing filter between the adaptive filter and the combining circuit, the impulse response of which second smearing filter corresponds to the impulse response of the smearing filter in the transmit channel; and
   (b) the complementary smearing filter in the receive channel being coupled between the combining circuit and said tapping point for the residual signal.

5. An arrangement as claimed in claim 4 further comprising, for passband data signal transmission:
   (a) a first modulator in the transmit channel in cascade with the smearing filter;
   (b) a second modulator corresponding to the first modulator in cascade with the smearing filter in the second signal path between the adaptive filter and the combining circuit; and
   (c) a demodulator associated with the first and the second modulators in the receive channel in cascade with the complementary smearing filter and after the combining circuit.

6. An arrangement for full-duplex data transmission over two-wire circuit, said arrangement comprising:
   a. a one-way transmit channel having an input for coupling with a baseband data transmitter and including a smearing filter;
   b. a one-way receive channel having an output for coupling with a baseband data receiver;
   c. a hybrid junction for interconnecting the transmit and receive channels and the two-wire circuit;
   d. an echo canceller comprising:
      i. an adaptive filter with adjustable filter coefficients for generating an approximated echo signal from signals in the transmit channel; and
      ii. an adjusting circuit for adjusting the filter coefficients, in response to signals in the transmit channel and in response to a residual signal in the receive channel, so as to minimize a predetermined function of the residual signal, said adjusting circuit being coupled with a tapping point in said receive channel so as to receive the residual signal; and
   e. a combining circuit in the receive channel for differentially combining the approximated echo signal with incoming signals from the receive channel to generate the residual signal;
   f. a complementary smearing filter in said receive channel between the hybrid junction and said tapping point; and
   g. delay means between an output of the data transmitter and the echo canceller, the delay means creating a delay in the approximated echo signal so as to substantially compensate for a signal delay resulting from the cascade of the smearing filter and the complementary smearing filter;
whereby the complexity of the echo canceller is not affected by the presence of the smearing and complementary smearing filters.

7. An arrangement as claimed in claim 6, further comprising, for passband data signal transmission:
   (a) a first modulator in the transmit channel in cascade with the smearing filter;
   (b) a second modulator corresponding to the first modulator between the adaptive filter and the combining circuit; and
   (c) a demodulator associated with the first and the second modulators in the receive channel after the combining circuit.

8. The arrangement of claim 6 wherein the smearing filter in the transmit channel is a time-discrete transversal filter with a shift register connected to the data transmitter output which shift register likewise forms part of the delay means.

* * * * *